Oct. 24, 1933.  F. J. JARVIS ET AL  1,932,289
WHEEL, ROLLER, AND THE LIKE
Filed Aug. 1, 1932
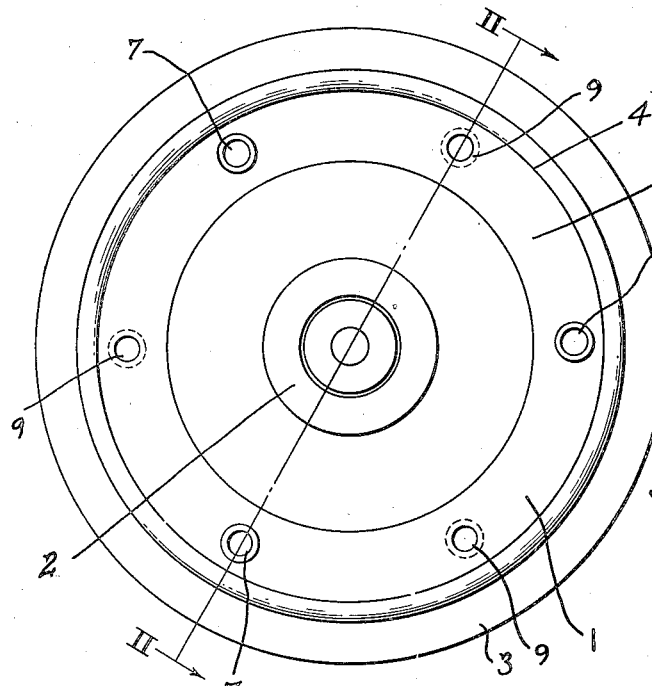
Fig. I.
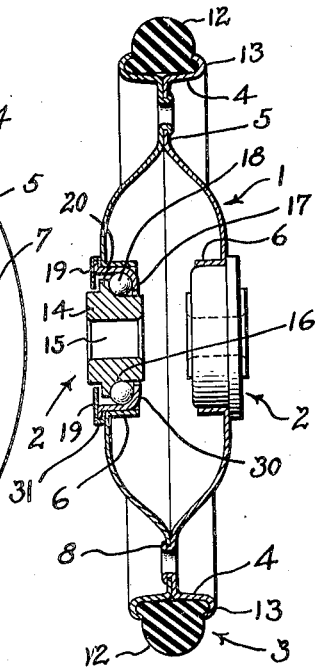
Fig. II.
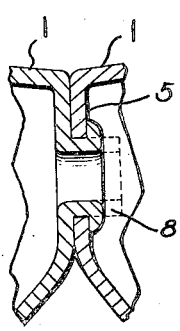
Fig. III.
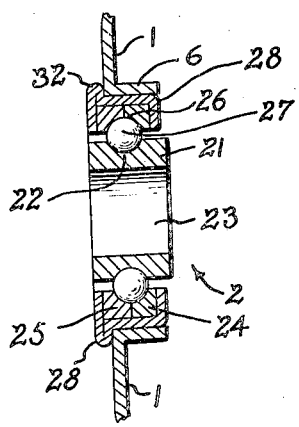
Fig. IV.
INVENTOR
FRANK J. JARVIS
CHARLES N. FRETTS
BY
Harry H. Styll
ATTORNEY Patented Oct. 24, 1933

1,932,289

UNITED STATES PATENT OFFICE 1,932,289

WHEEL, ROLLER, AND THE LIKE

Frank J. Jarvis, Palmer, and Charles N. Fretts, West Springfield, Mass., assignors to Jarvis & Jarvis, Inc., Palmer, Mass., a corporation of Massachusetts Application August 1, 1932. Serial No. 627,187

2 Claims. (Cl. 301—63)

This invention relates to improvements in wheels or rollers and like devices and has particular reference to improvements in relatively small structural wheels or rollers with frictionless bearings and to an improved process for making and assembling the same.

One of the principal objects of the invention is to provide a simple, inexpensive structural wheel or roller with frictionless or anti-friction bearings and an improved, simplified, and inexpensive process of making and assembling the same.

Another object of the invention is to provide a wheel or roller with an inexpensive resilient tire that will reduce rolling friction to a minimum.

Another object of the invention is to provide a structural wheel or roller of pressed or stamped material wherein the two halves are facsimiles of each other and integrally provide for the tire and bearing seatings and the means for securing each half together and wherein all the parts are secured together by simple, inexpensive, and direct pressure means without extraneous securing devices.

Another important object of the invention is to provide a structural frictionless or anti-friction wheel or roller so inexpensively produced that it may be applied to the more inexpensive type of devices mounted on wheels, such as children's toys, scooters, wagons, and other forms of wheeled toys, as well as casters and other small wheel devices wherein free and easy running is an advantage.

Other objects and advantages of the invention will become apparent from the following description taken in conjunction with the accompanying drawing. It is apparent that many changes in the arrangement of parts and details of construction and in the steps of production and assembly may be made without departing from the spirit of the invention as expressed in the accompanying claims. We therefore do not wish to be limited to the exact matters shown and described as the preferred forms have been shown and described by way of illustration only.

Referring to the drawing:

Fig. I is a side elevation of the invention.

Fig. II is a cross section of Fig. I on line II—II.

Fig. III is an enlargement of a portion of Fig. II, and

Fig. IV is a portion of Fig. II showing a modified form of frictionless bearing.

In the prior art it has been found that the wheels and wheel bearings of inexpensive articles such as scooters and children's toys and small casters and rollers generally, because of the fact that they, on account of the necessity of economy in production, were provided with simple plain cylinder bearings and also with resilient tires of a nature to crush down and increase the rolling friction—prevented free and easy rolling both on account of the axle bearing and the tire friction. The structural arrangements also included more or less expensive and undesirable securing devices and more or less expensive production and assembling operations. It is, therefore, one of the principal objects of this invention to overcome these disadvantages and to provide processes that will enable the production and application of a free and easy rolling wheel or roller for such inexpensive articles.

Referring to the accompanying drawing wherein similar reference characters denote corresponding parts, the invention comprises broadly a wheel body 1, a tire 3, and an anti-friction axle bearing 2.

The body portion 1 is preferably made of a pressed or stamped metallic plate as shown in Figs. I and II. The plates of both sides are facsimiles requiring hence only one set of stamping or pressing dies as the parts are not made rights and lefts. The plate 1 is pressed to shape with the tire engaging portion 4, the contacting and securing portion 5, and the axle bearing engaging portion 6 as shown in Fig. II. Spaced around the securing portion 5 is a series of holes or openings. The alternate holes 7 are punched up with a projecting rim or boss 8, and the alternate holes 9 are punched in without the said projection 8. When the plates 1 are assembled as in Fig. II, two of them are placed together with the bearing engaging portions 6 projecting inwardly of the wheel, and so that the projecting rims 8 will extend through the unrimmed holes 9. The portions of the rims 8 are then pressed down or riveted down to secure the two plates together as shown in Fig. III.

The tire 3 has a relatively wide engagement with the tire seat 4 of the wheel body as compared with the width 12 of the bearing portion of the tire which extends beyond the seat and is substantially circular in cross section. This insures that the tire will not flatten to a marked degree, hence the rolling friction will be small as compared with a tire that flattens and widens at the point where it engages the rolling surface. The tire 3 is held on the tire base by the hook members 13 of the wheel body forming a clincher connection.

The anti-friction bearing 2 comprises the hub race member 14 having the axle opening 15 and the ball race 16, an outer race member 17, the balls 18 fitting between the races and the thin holding plate 19 pressed over the outer end of the outer race member 17 and over the projection 20 on the inner race member holding the parts together as an integral unit as shown in Fig. II.

The outer race member has the flange 30 on its internal end extending over the balls 18 and on its outer end the flange 31 extending away from the inner race member 14 and spaced from the side plate 1. The holding plate 19 is pressed over the flange 31 and extends between it and the side plate 1, forming a stop to limit the inward extent of the bearing unit into the bearing seat.

In Fig. IV a modified form of anti-friction bearing unit is shown. This bearing comprises the hub ball race 21, having the race 22 and the opening 23, an outer race member of two parts 24 and 25 having a ball race 26, the balls 27 between the races and the thin shell plate 28 compressed over the outer race members.

The plate 28 has the projection 32 extending beyond the tire seat and abutting the plate 1 to limit the extent of the bearing unit into the bearing seat.

Other forms of anti-friction bearing units may be used and other forms of body plates may also be employed if desired.

The device is produced as follows:

The body plate 1 is pressed out to shape with the openings 7 and 9, the tire base 4, the securing part 5, and the bearing engaging part 6 preferably of metal or other ductile material. The anti-friction bearing units are made and assembled as has been described above. The tire is an annular ring of relatively soft rubber or other resilient material moulded to shape, or it may be made in strip form and the ends joined together.

The parts are assembled as follows:

Two body plates are placed face to face in reversed relation, bearing against each other on the portion 5 and the rims 8 around the holes 7 projecting through the holes 9. The tire is placed in the seat 4 and the anti-friction bearing units entered in the bearing portion 6. The parts are then pressed together, the rims 8 being riveted over the holes 9 and the bearing units forced in the bearing engaging portions 6 so that the two plates 1 are riveted together and the bearing units forced by compression into the part 6. No other holding members are required. If desired, the tire may be put in place after the plates 1 are riveted together, in which case the seats 4 and the tires are made to accommodate this procedure, and if desired also the bearing units may be pressed in place either before or after the plates have been riveted together. If a strip tire is used, the ends may be suitably cemented together.

Also, if desired, interengaging means may be employed between the anti-friction bearing units and the part 6. Various changes may be made in the shape of the tires and the tire seats and in the wheel body. Various forms of anti-friction bearings may also be employed.

From the foregoing description it will be seen that there has been provided an exceedingly inexpensive and simple process of production and assembly, and an efficient, inexpensive wheel or roller well adapted to carry out and obtain all the objects and advantages of the invention.

Having described our invention, we claim:

1. A wheel of the class described comprising a pair of centrally apertured sheet metal discs, said discs each being formed of a single piece of metal having an intermediate portion engaging and secured to the other and an inner portion terminating in an inturned annular hub portion, a pressed metal sheet portion having a portion frictionally fitting the inturned annular hub portion of each disc, and having a flange portion fitting over the outer edge of the hub portion and a second flanged portion forming a ball bearing seat, a hub bearing portion within each second flange portion having a ball bearing seat aligned with the ball bearing seat of the second flanged portion and an external recessed portion, ball bearings in the aligned ball bearing seats and a thin sheet metal closure plate having a flange extending between the disc and the outer flange of the flanged portion, and a flange extending into the recess of the hub bearing portion to provide a retaining wall to prevent longitudinal displacement of the ball bearings with respect to the discs.

2. A wheel of the class described comprising a pair of centrally apertured metal discs, said discs each being formed of a single piece of metal having an intermediate portion engaging and secured to the other and an inner portion terminating in an inturned annular hub portion, a pressed metal sheet portion having a portion frictionally fitting the inturned annular hub portion of each disc and having a flange portion fitting over the outer edge of the hub portion, a hub bearing portion within the said pressed metal portion and having a ball bearing seat therein, ball bearings in the ball bearing seat and a pressed metal portion extending from the flanged portion fitting over the outer edge of the hub portion inwardly towards the axis of the hub bearing portion to provide a retaining wall to prevent longitudinal displacement of the ball bearings with respect to the discs.

FRANK J. JARVIS.
CHARLES N. FRETTS.